United States Patent
Balch et al.

(10) Patent No.: US 11,028,281 B2
(45) Date of Patent: Jun. 8, 2021

(54) FREE RADICAL POLYMERIZABLE WATER-BASED INKJET COMPOSITIONS

(71) Applicant: SUN CHEMICAL CORPORATION, Parsippany, NJ (US)

(72) Inventors: Andrew Balch, Bath (GB); Derek Ronald Illsley, Bath (GB)

(73) Assignee: Sun Chemical Corporation, Parsippany, NJ (US)

(*) Notice: Subject to any disclaimer, the term of this patent is extended or adjusted under 35 U.S.C. 154(b) by 105 days.

(21) Appl. No.: 16/320,233

(22) PCT Filed: Jul. 25, 2017

(86) PCT No.: PCT/US2017/043676
§ 371 (c)(1),
(2) Date: Jan. 24, 2019

(87) PCT Pub. No.: WO2018/022590
PCT Pub. Date: Feb. 1, 2018

(65) Prior Publication Data
US 2019/0264054 A1   Aug. 29, 2019

Related U.S. Application Data

(60) Provisional application No. 62/367,290, filed on Jul. 27, 2016, provisional application No. 62/373,524, filed on Aug. 11, 2016.

(51) Int. Cl.
| | | |
|---|---|---|
| C09D 11/38 | (2014.01) | |
| C09D 11/322 | (2014.01) | |
| B41M 7/00 | (2006.01) | |
| C09D 11/101 | (2014.01) | |
| C09D 11/52 | (2014.01) | |
| C09D 11/324 | (2014.01) | |
| C09D 11/328 | (2014.01) | |

(52) U.S. Cl.
CPC ........... C09D 11/38 (2013.01); B41M 7/0045 (2013.01); B41M 7/0081 (2013.01); C09D 11/101 (2013.01); C09D 11/322 (2013.01); C09D 11/52 (2013.01); C09D 11/324 (2013.01); C09D 11/328 (2013.01)

(58) Field of Classification Search
CPC ..... C09D 11/38; C09D 11/322; C09D 11/101; C09D 11/52; C09D 11/324; C09D 11/328; B41M 7/0081; B41M 7/0045
See application file for complete search history.

(56) References Cited

U.S. PATENT DOCUMENTS

| | | | |
|---|---|---|---|
| 6,846,851 B2 | 1/2005 | Nakhmanovich et al. | |
| 7,439,285 B2 | 10/2008 | Mozel et al. | |
| 8,939,565 B2 | 1/2015 | Belelie et al. | |
| 2004/0209976 A1 | 10/2004 | Nakhmanovich et al. | |
| 2008/0085369 A1 | 4/2008 | Cai et al. | |
| 2008/0186373 A1 | 8/2008 | Rolly | |
| 2008/0282932 A1 | 11/2008 | Kiomoto et al. | |
| 2009/0163615 A1 | 6/2009 | Halahmi et al. | |
| 2010/0152316 A1 | 6/2010 | Cornell et al. | |
| 2011/0104453 A1 | 5/2011 | Shjinjo et al. | |
| 2011/0175089 A1 | 7/2011 | Zheng et al. | |
| 2012/0306964 A1 | 12/2012 | Nakajima | |
| 2014/0151606 A1 | 6/2014 | Lowenthal et al. | |
| 2014/0151607 A1 | 6/2014 | Lowenthal et al. | |
| 2014/0347427 A1 | 11/2014 | Yamashita et al. | |
| 2014/0362150 A1 | 12/2014 | Yamashita et al. | |
| 2015/0191614 A1 | 7/2015 | Nagashima et al. | |
| 2015/0247044 A1* | 9/2015 | Brandstein | C09D 11/101 347/20 |
| 2015/0329730 A1 | 11/2015 | Yang et al. | |
| 2016/0046816 A1 | 2/2016 | Takahashi et al. | |

FOREIGN PATENT DOCUMENTS

| | | |
|---|---|---|
| EP | 1 543 704 B1 | 5/2006 |
| EP | 2 639 272 A1 | 9/2013 |
| EP | 2 960 306 A1 | 12/2015 |
| JP | H0597944 A | 4/1993 |
| JP | 2003/292857 | 10/2003 |
| JP | 2012184376 A | 9/2012 |
| JP | 2013119574 A | 6/2013 |
| JP | 2013216864 A | 10/2013 |
| JP | 2015174231 A | 10/2015 |

(Continued)

OTHER PUBLICATIONS

Product Bulletin for 2-methyl-1,3-propanediol by Chemio.com, https://www.chemeo.com/cid/68-056-5/1%2C2-Propanediol%2C%202-methyl-, © 2016.*
Author Unknown, Dow Product Information Bulletin "Proglyde DMM", Mar. 2004, pp. 1-2.*
Author Unknown, Dow Product Information Bulletin "Dowanol TPM", 2012, pp. 1-2.*

(Continued)

*Primary Examiner* — Patrick D Niland
(74) *Attorney, Agent, or Firm* — Marian E. Fundytus; Ostrolenk Faber LLP.

(57) ABSTRACT

Described herein are free radically polymerizable aqueous inkjet compositions that include water, a water-soluble or water-dispersible component polymerizable by free radical polymeration, and one or more water-soluble organic solvents in compliance with following Formula I:

$$\Sigma(X_n \cdot H_n \cdot B_n) \leq \rho \qquad (I),$$

where $\rho$ is 2,000,000.

The variables of the formula are defined herein. Also described are printed articles that include the inkjet compositions of the disclosure. The inkjet compositions dry rapidly while remaining fluid during printing, thereby avoiding clogging in the print head.

21 Claims, No Drawings

(56) References Cited

FOREIGN PATENT DOCUMENTS

| WO | WO 03093378 A1 | 11/2003 |
|---|---|---|
| WO | WO 2004028225 A1 | 4/2004 |
| WO | WO 2008/031720 A1 | 3/2008 |
| WO | WO 2013024928 A1 | 2/2013 |
| WO | WO 2014/045192 A1 | 3/2014 |
| WO | WO 2014/085473 | 6/2014 |
| WO | WO 2014/098002 A1 | 6/2014 |
| WO | WO 2014/111349 | 7/2014 |
| WO | WO 2014/119771 A1 | 8/2014 |
| WO | WO 2014/168240 A1 | 10/2014 |
| WO | WO 2015/116028 A1 | 8/2015 |
| WO | WO 2015/148094 A1 | 10/2015 |
| WO | WO 2015/158752 A1 | 10/2015 |
| WO | WO 2015/183719 A1 | 12/2015 |
| WO | WO 2015/189639 A2 | 12/2015 |
| WO | WO 2015/197472 A1 | 12/2015 |
| WO | WO 2016/178989 A1 | 11/2016 |
| WO | WO 2017/004258 A1 | 1/2017 |
| WO | WO 2015/189639 A2 | 12/2017 |

OTHER PUBLICATIONS

Author Unknown, Monument Chemical "Technical Product Information for Dipropylene Glcyol (DPG)", Jan. 15, 2018, pp. 1-2.*
U.S. Patent Application: U.S. Appl. No. 16/314,237, filed Dec. 28, 2018.
Written Opinion of the International Searching Authority issued in PCT/US2017/043663 dated Oct. 6, 2017.
PCT International Search Report issued in PCT/US2017/043663 dated Oct. 10, 2017.
Supplementary EP Search Report issued in related EP 17 83 5102 dated Mar. 11, 2020.
Svab L et al: "A calorimeter for the determination of enthalpies of vaporization at high temperatures and pressures", Journal of Chemical Thermodynamics, Academic Press, London, GB, vol. 20, No. 5, May 1, 1988, pp. 545-550, XP023946779, ISSN: 0021-9614, DOI: 10.1016/0021-9614(88)90082-1 [retrieved on May 1, 1988].
Majer V et al: "Enthalpies of vaporization and cohesive energies for a group of chlorinated hydrocarbons", Journal of Chemical Thermodynamics, Academic Press, London, GB, vol. 12, No. 9, Sep. 1, 1980, pp. 843-847, XP023945443, ISSN:0021-9614,DOI: 10.1016/0021-9614(80)90028-2 [retrieved on Sep. 1, 1980].
Anonymous: "2-Methylpropane-1,3-diol C4H10O2: ChemSpider",Jan. 1, 2020, XP055667621, Retrieved from the Internet: URL:http://www.chemspider.com/Chemical-Str ucture.67654.html [retrieved on Feb. 12, 2020].
Anonymous: "1,2-Ethanediol", Jan. 1, 2018, XP055667602, Retrieved from the Internet: URL:https://webbook.nist.gov/cgi/cbook.cgi ?ID=C107211&Mask=4 [retrieved on Feb. 12, 2020] * paragraph "Enthalpy of Vaporization" on pp. 3 and 4 *.
Supplementary EP Search Report issued in courter part EP 17 83 5107 dated Mar. 11, 2020.
International Preliminary Report on Patentability issued in PCT/US2017/043676 dated Jan. 29, 2019.
International Preliminary Report on Patentability issued in PCT/US2017/043663 dated Jan. 29, 2019.
PCT International Search Report issued in PCT/US17/43676 dated Oct. 6, 2017.
Written Opinion of the International Searching Authority issued in PCT/US17/43676 dated Oct. 6, 2017.
N-Methyl-2-Pyrrolidone (NMP) (Eastman Chemical Company) Oct. 8, 2015, second page.
EuPIA Guideline on Printing Inks Applied to the Non-Food Contact Surface of Food Packaging Materials and Articles, Nov. 2011, p. 6.

* cited by examiner

FREE RADICAL POLYMERIZABLE WATER-BASED INKJET COMPOSITIONS

The present application is a § 371 National Stage application based on PCT/US2017/043676 filed Jul. 25, 2017, which claims priority to U.S. Provisional Patent Application No. 62/367,290 filed Jul. 27, 2016, and U.S. Provisional Patent Application No. 62/373,524 filed Aug. 11, 2016, each of which is incorporated herein by reference in its entirety.

INCORPORATION BY REFERENCE

The present International application filed under the provisions of the Patent Cooperation Treaty (PCT) hereby incorporates by reference in its entirety the International application filed under the provisions of the PCT having International Application No. PCT/US2017/043663 filed Jul. 25, 2017.

BACKGROUND OF THE INVENTION

Currently available water-based inkjet compositions experience slow drying after printing and poor physical resistance to wear when compared to UV cured inks. On the other hand, UV curable inkjet ink compositions have to be applied in relatively thick film forming amounts, e.g., films of about 10 to 12 microns in thickness, and even greater thicknesses in instances of composite print designs. This causes problems in single pass printing operations, due to the printing of relatively thick films. Thick films may cause problems to the printer as a result of an uneven ink build up across the web and distortion of the substrate roll in the machine.

Water-based inkjet compositions may include humectant-type solvents, such as glycerol and propylene glycol. Humectant solvents keep the inkjet composition in a fluid state. However, humectant-type solvents increase the drying time of the ink composition, often to unacceptably long drying periods. Glycerol and propylene glycol have high boiling points, respectively 290° C. and 187° C., and high heats of vaporization, respectively around 990 and 880 J/g. The presence of a solvent with a high boiling point and a high heat of vaporization helps to keep the ink in a fluid state so that it does not dry in the printing apparatus, e.g., the inkjet printing head. However, these kinds of solvents can slow the drying of the ink after printing on the substrate. This is particularly the case when the ink is printed on non-absorbent substrates, which includes plastic films such as polyester films. When inks comprising conventional humectants such as glycerol and propylene glycol are applied to plastic films, there can be an issue with the drying speed of these inks resulting, in printing speeds that are unacceptably slow. If such slow drying solvents are not removed sufficiently before curing, then they may be retained in the printed and cured ink film, causing the films to be soft and tacky, which films are prone to blocking, for example.

Energy-curable compositions applied to the non-contact surface of primary or secondary packaging intended for foodstuffs fall within the guidelines set forth in Article 3 of Regulation (EC) No 1935/20041. The regulations require that materials and articles in contact with food:

Shall be manufactured in accordance with good manufacturing practices, so that under normal or foreseeable conditions of use, they do not transfer their constituents to food in quantities which could:
  endanger human health; or
  bring about an unacceptable change in the composition of the food; or
  bring about deterioration in the organoleptic characteristics thereof.

The European Printing Ink Association (EuPIA) recommends that Article 3 be followed when producing printed matter for food packaging and has provided guidelines for the selection of raw materials to be used in printing inks for food packaging. EuPIA has also published guidelines for the testing of printed matter. Where no SML (specific migration limit) exists for a specific component, then the following migration limits apply:

A target migration limit of no concern for non-evaluated substances of 10 ppb [parts-per-billion] is the ultimate objective, to be consistent with other food contact materials.

In particular, a substance is acceptable if its specific migration does not exceed:
  10 ppb, in case of insufficient toxicological data
  50 ppb if the substance is demonstrated not to be genotoxic according to [European Food Safety Agency] Guidance [footnote omitted]
  a value higher than 50 ppb, if supported by favorable toxicological data and/or evaluation done in accordance with EFSA Guidance

*EuPIA Guideline on Printing Inks Applied to the Non-Food Contact Surface of Food Packaging Materials and Articles*, November 2011, page 6.

EuPIA provides guidelines for how to measure the potential level of materials migrating from printed inks. For inks and coatings applied to the non-food contact surface of packaging (i.e. the outer surface), whether that is to the primary packaging or secondary packaging (labels and sleeves), then the most likely route of migration of ink material that may cause contamination of the foodstuff is through set off migration. Set off migration occurs when printed sheets, labels, etc. contact each other, such as when stacked or rolled prior to being used. In this arrangement, the printed ink applied to a non-food contact side of one label or package contacts the food-contact side of another label or package. Materials in the ink may then migrate to the food contact side of the label or packaging, such as by diffusion. Some migratable materials, originating in the ink on the printed surface side, could then be present on the food contact side and may then leach into the food and contaminate same once the package is filled or label is applied.

References of interest may include WO2014/168240, WO2014/119771, US20080282932, US20150191614, JP2013119574, JP2013119574, JP2015174231, WO2014/098002, WO2014/045192, JP2013216864, US20120306964, JP2012184376, US20080186373, US6846851, EP2960306, WO2015/158752, WO2015/183719, US20140362150, US20140347427, US2010/0152316, WO2015/116028, U.S. Pat. No. 8,939,565, WO2015/189639, and US20140347427.

SUMMARY OF THE INVENTION

Described herein are free radically polymerizable, water-based inkjet compositions comprising:
  water;
  a water-soluble or water-dispersible component polymerizable by free radical polymeration; and one or more water-soluble organic solvents that comply with following Formula I:

$$\Sigma(X_n \cdot H_n \cdot B_n) \leq \rho \quad (I)$$

wherein each individual n corresponds to a water-soluble organic solvent present in the composition;

n is an integer≥1;

$X_n$ is the amount on a weight basis, of each water-soluble organic solvent present in the composition;

Each $X_n$ is expressed as $100(w_n/w_{total})$;

$w_n$ is the weight of a water-soluble organic solvent n present in the composition represented by a value of n;

$w_{total}$ is the weight of the ink jet composition;

$H_n$ is Heat of Vaporization of each water-soluble organic solvent n in Joules/gram (J/g);

$B_n$=Boiling Point of each water-soluble organic solvent n (° C.);

Σ=sum of the multiplication products of $X_n$, $H_n$ and $B_n$ for each water-soluble organic solvent present in the composition; and ρ is <2,000,000.

In one inventive aspect, the water-soluble or water-dispersible component comprises water-dispersible acrylated polyurethane polymerizable by free radical polymerization. In another inventive aspect, the weight average molecular weight of the water-dispersible acrylated polyurethane polymerizable by free radical polymerization is 500 to 50,000 Daltons, preferably 1000 to 20000, and more preferably 1000 to 15,000. In yet another aspect, the water-dispersible acrylated polyurethane polymerizable by free radical polymerization comprises ethylenically unsaturated groups.

In one inventive aspect, the one or more water-soluble organic solvents, are, with the inclusion of water, the sole solvents of the present inkjet compositions. In other words, no other solvent, with the exception of water, is present that is not subject to formula I.

In yet another inventive aspect, the boiling point of each water-soluble organic solvent present in the composition is 150° C. to 250° C., preferably 250° C. In yet another inventive aspect, the amount of water-soluble organic solvents present in the ink jet compositions is 5 wt % to 40% wt %, based on the total weight of aqueous inkjet compositions.

In yet another inventive aspect, the amount of water-soluble organic solvents having boiling points of 150° C. of greater is 5 wt % to 30 wt %, based on the total weight of aqueous inkjet compositions.

In one inventive aspect, the total weight of the aqueous inkjet compositions refers to the total weight of the inkjet compositions prior to drying and curing.

In yet another inventive aspect, the total amount of water-soluble organic solvents having boiling points of 150° C. or greater and heats of vaporization of 400 J/g or greater is, based on the total weight of the composition, 0.01 wt % to 12 wt %, preferably 0.01 wt % to 10 wt %, more preferably 0.01 wt % to 5 wt %, and even more preferably, 0.01 wt % to 2.5 wt %.

In yet another inventive aspect, ρ is less than 1,900,000, preferably less than 1,800,000.

In one inventive aspect, ρ is expressed as J·° C./g.

In yet another inventive aspect, the inkjet compositions include one or more photoinitiators.

In yet another aspect, described herein are printed articles comprising a substrate and a printed layer comprising the free radical polymerizable inkjet compositions described herein. Such substrates include the following non-limiting materials: polyethylene, polypropylene, oriented polypropylene (OPP), polyesters (e.g., polyethylene terephthalate (PET), glycol modified PET (g-PET) polyamide, cellulose acetate, and polylactic acid.

In yet another inventive aspect, the inkjet compositions comprise one or more photoinitiators that, after printing and curing on a substrate, do not migrate, or exhibit minimal migration on a scale that is acceptable within the field, e.g., the amount of migration of photoinitiator is in compliance with the standards of the EUIPA which are mentioned above, e.g., less than 50 ppb.

In yet another inventive aspect, the present disclosure describes a method for printing an article comprising: printing, by inkjet printing, an inkjet composition as described herein on a substrate; removing at least a portion of the water and organic solvent from the composition; and energy curing the composition.

The inventors have surprisingly found that free radically polymerizable, water-based inkjet compositions as described herein can be deposited via ink jet printers at a thinner film thickness when compared to UV curable inks that are currently available, which are deposited at thickness of 10-12 microns. Advantageously, when the inks are dried prior to UV curing, the film thickness is reduced to only a few microns, limiting roll distortion while maintaining many of the positive product resistance properties associated with UV curable inks.

DETAILED DESCRIPTION OF THE INVENTION

The Applicants have surprisingly found that free radically polymerizable water-based inkjet composition including water-soluble organic solvents that have a value for ρ of less than or equal to 2,000,000 J·° C./g, as defined by formula I, provide an excellent combination of printing properties, particularly when printing on non-absorbent substrates such as plastic materials, such as polyester films. By setting the result of formula I so that ρ is less than or equal to 2,000,000 J·° C./g, the resulting ink jet composition will exhibit acceptably rapid drying while not drying so quickly as to possibly clog the flow paths in the print head of the ink jet printing apparatus.

For example, for humectant-type solvents having boiling points greater or equal to than 150° C. and heats of vaporization greater than or equal to 400 J/g, applying formula I would guide the ink formulator to include a controlled amount of such solvents, in order to stay within the 2,000,000 upper value for ρ. The inclusion of such humectant type solvents does benefit the inkjet compositions, as such solvents help the increase the open times of the inkjet composition in the inkjet print head. Humectant-type solvents keep the inkjet composition sufficiently fluid by retaining water throughout the printing operation. By doing so, the inkjet fluid does not dry in the print head or other component parts of the printer. If this happened, unwanted blockages in the print head could occur. Such humectant-type solvents include glycerol, propylene glycol, hexylene glycol, butylene glycol, sorbitol, urea, and glyceryl triacetate. The boiling points and heats of vaporization of at least some of these solvents are provided in Table 1, appearing later in this disclosure.

On the other hand, the inclusion of humectant-type solvents increase the drying time of an inkjet composition after printing, a condition related to the amounts that such solvents are included in the composition (e.g., the greater the amount, the longer the drying time). The Applicants have found that the amounts of humectant-type solvents should be controlled, e.g., limited. They have further found that the amounts thereof can be controlled by including water-soluble organic solvents having relatively lower boiling points and/or heats of vaporization, and as a result, the amounts of humectant-type solvents included in the inkjet compositions can be lowered.

The Applicants have further found that by including water-soluble organic solvents having relatively lower boiling points and/or heats of vaporization, the drying times of the inkjet compositions are reduced significantly. The resulting inventive inkjet compositions of the present disclosure exhibit a desirable combination of open time in the print head (e.g., no drying, no clogging) and relatively rapid drying upon printing.

Thus, in one aspect of the present disclosure, the inventive inkjet compositions include a solvent blend of water-soluble organic solvents that includes a portion of humectant-type solvents. Preferably, the amount of humectant-type solvents are present in the inkjet compositions in an amount of 0.1 wt % to 12 wt %, preferably 0.01 wt % to 10 wt %, more preferably 0.01 wt % to 5 wt %, and even more preferably, 0.01 wt % to 2.5 wt %, based on the total weight of the inkjet compositions. When such solvents are preferably present in an amount of about 5 wt % to 12 wt %, the viscosity of the inkjet compositions are particularly compatible with current print head designs. This is notable, as the inventors have found that raising the concentration of the resin component (e.g. acrylated polyurethane dispersion) to achieve a desired viscosity may result in poor jetting performance.

In another aspect of the present disclosure, the total amount of polymer, by weight, contributed by the water-soluble or water-dispersible component polymerizable by free radical polymeration, such as acrylated polyurethane dispersions, is 2.0 wt % to 20 wt %, preferably 2.0 wt % to 18 wt %, and more preferably, 2.0 wt % to 16 wt %. For example, and to demonstrate the basis for these values, the water-dispersible acrylated polyurethane is present in the composition, based on the weight of the polyurethane and the total weight of the composition, in an amount of 2.0 wt % to 20 wt %, preferably in an amount of 2.0 wt % to 18 wt %, and more preferably in an amount of 2.0 wt % to 16 wt %.

The ink-jet compositions preferably include a water-soluble or water-dispersible component that is polymerizable by free radical polymerization, which preferably is a water-soluble or water-dispersible polyurethane which has groups that polymerize under the action of free radicals. For example the component may be an acrylated polyurethane in an aqueous dispersion (Ac-PUD). Other polyurethanes comprising any other free radically polymerizable groups may also be used as the water-soluble or water-dispersible component that is polymerizable by free radical polymerization. Such polyurethanes may have pendant groups polymerizable by free radical polymerization such as acrylates, methacrylates, maleates, fumarates, vinyl ethers, vinyl amides, propenyl ethers, vinyl esters and acrylamides, as well as other kinds of ethylenically unsaturated free radical polymerizable groups.

When the water-soluble or water-dispersible component polymerizable by free radical polymeration is an acrylated polyurethane present in an aqueous dispersion, e.g., an acrylated polyurethane dispersion, a commercially available formulation may be used in the present inkjet compositions. Examples of commercially available acrylated polyurethane dispersions, include MS 10/1312, and MS 10/1311 (from Allnex); Neorad R-440, R-441, R-444, R-447, R-448, R-465, UV-14, UV-20, UV-65, and UV-TN6711 (from DSM); Laromer LR8949, LR8983, LR9005, UA 9059, UA9060, UA9064, and UA9095 (from BASF); and Bayhydrol UV 2282, UV 2317, UV VP LS 2280, UV VP LS 2317, UV XP 2629, UV XP 2687, UV XP 2689, UV XP 2690, and UV XP 2775 (from Bayer). Combinations thereof may be used.

Other acrylated and other ethylenically unsaturated resins may be used in the present inkjet formulations. Other acrylated resin dispersions include acrylated polyester dispersions such as the Laromer PE range from BASF; water soluble epoxy acrylates such as Laromer 8765 from BASF and CN132 from Sartomer; styrene maleic anhydride adducts (SMA), in which the anhydride group of a styrene-maleic copolymer is reacted with a OH-functional monomer; acetoacetate-functional polymers such as acetoacetate-functional poly(vinyl alcohol) such as Gohsenx Z from Nippon Gohsei; acrylic emulsions such as those sold under the trade names Joncryl (BASF), Revacryl (Synthomer), Hycar (Lubrizol), Neocryl (DSM), Neboplast (Necarbo), and the Picassian AC range (Picassian Polymers); solution acrylics such as those sold under the trade names Joncryl (BASF); poly(meth)acrylic acid such as those sold under the trade name Sokalan (BASF); polyurethane dispersions such as those sold under the trade names Sancure (Lubrizol), Syntegra (Dow), Luplen (BASF), and Beetafin (BIP); polyester emulsions such as those sold under the trade names Eastek (Eastman); PVC Emulsions such as those sold under the trade names Vycar (Lubrizol); polyamide dispersions such as those sold under the trade names Casamid (Thomas Swann) and Hydrosize (Michelman); water-based alkyds such as those sold under the trade names Synaqua (Arkema); poly(vinyl alcohol) dispersions such as those sold by Kuraray, Nippon Gohsei & Celanese; polyethylene glycols; polyvinyl pyrrolidones such as those sold under the trade names PVP-K15, K30, K60, K90 (ISP); maleic resins such as those sold under the trade names Hydrorez (Lawter); and natural resins such as water-based shellacs (Worlee), Procote (DOW), and Revertex (Synthomer). Combinations thereof may be used.

It may be preferable to neutralize the polymer resins with an organic base. Suitable organic bases that can be used for neutralizing include, but are not limited to, ammonia, triethanolamine, triisopropanolamine, dimethyl aminoethanol or arginine. Where acrylated polyurethanes are used in the inventive compositions, the neutralizing agent is preferably a tertiary amine or an inorganic base, including but not limited to alkali metal oxides, alkali metal hydroxides or alkali metal carbonates, with sodium hydroxide or potassium hydroxide being the preferred inorganic bases. Where tertiary amines such as triethanolamine are used as neutralizing agents, they may serve the dual function of neutralizing the resin and acting as an amine synergist involved in the production of free radicals during free radical polymerization.

In addition to the water-soluble or water-dispersible component polymerizable by free radical polymeration, the present inkjet compositions may include one or more additional monomers and oligomers that can be co-polymerized with the polymerizable water-soluble or water-dispersible component. Such monomers include, for example, acrylate and meth(acrylate) monomers and oligomers that are fully water soluble and therefore easy to use, such as polyethylene glycol 400 diacrylate. Monomers and oligomers that are insoluble or have limited water compatibility can be included in the present inkjet compositions, such as with co-solvents that aid compatibility. They may be dispersed into water using suitable dispersion techniques. Thus, water-insoluble monomers and oligomers can be incorporated into the dispersed phase of acrylated polyurethane dispersions during the synthesis of such acrylated polyurethane dispersions. Alternatively, water-insoluble monomers and oligomers may be dispersed into the aqueous phase of the inventive compositions via the use of appropriate surfactants.

In a preferred aspect, the particle sizes of the inkjet composition are preferably 1 micron or less.

In addition to the water soluble or water dispersible component that is polymerizable by free radical polymerization, the present inkjet composition may also include ethylenically unsaturated monomers polymerizable by free radical polymerization. Examples of suitable monofunctional ethylenically unsaturated monomers that may be included in the present inkjet compositions include, but are not limited to, the following: 2-(ethoxyethoxy)ethyl acrylate; 2-phenoxyethyl acrylate; 2-phenyl phenoxyethyl acrylate; 2-phenoxyethyl methacrylate; $C_{12}$-$C_{14}$ alkyl methacrylate; $C_{16}$-$C_{18}$ alkyl acrylate; $C_{16}$-$C_{18}$ alkyl methacrylate; caprolactone acrylate; cyclic trimethylolpropane formal acrylate; ethoxylated (4) nonyl phenol acrylate; isobornyl acrylate; isobornyl methacrylate; isodecyl acrylate; lauryl acrylate; methoxy polyethylene glycol (350) monomethacrylate; octyldecyl acrylate; polypropylene glycol monomethacrylate; stearyl acrylate; tetrahydrofurfuryl acrylate; tetrahydrofurfuryl methacrylate; tridecyl acrylate; and combinations thereof.

Examples of suitable polyfunctional ethylenically unsaturated monomers that may be included in the present inkjet compositions include, but are not limited to, the following: 1,3-butylene glycol dimethacrylate; 1,4-butanediol dimethacrylate; 1,6-hexanediol diacrylate; 1,6-hexanediol dimethacrylate; alkoxylated diacrylate; diethylene glycol dimethacrylate; dipropylene glycol diacrylate; ethoxylated (10) bisphenol A diacrylate; ethoxylated (2) bisphenol A dimethacrylate; ethoxylated (3) bisphenol A diacrylate; ethoxylated (3) bisphenol A dimethacrylate; ethoxylated (4) bisphenol A diacrylate; ethoxylated (4) bisphenol A dimethacrylate; ethoxylated bisphenol A dimethacrylate; ethoxylated (10) bisphenol A dimethacrylate; ethylene glycol dimethacrylate; polyethylene glycol (200) diacrylate; polyethylene glycol (400) diacrylate; polyethylene glycol (400) dimethacrylate; polyethylene glycol (600) diacrylate; polyethylene glycol (600) dimethacrylate; propoxylated (2) neopentyl glycol diacrylate; tetraethylene glycol diacrylate; tetraethylene glycol dimethacrylate; tricyclodecane dimethanol diacrylate; tricyclodecane dimethanol dimethacrylate; triethylene glycol diacrylate; triethylene glycol dimethacrylate; tripropylene glycol diacrylate; ethoxylated (15) trimethylolpropane triacrylate; ethoxylated (3) trimethylolpropane triacrylate; ethoxylated (6) trimethylolpropane triacrylate; ethoxylated (9) trimethylolpropane triacrylate; ethoxylated (5) pentaerythritol triacrylate; ethoxylated (20) trimethylolpropane triacrylate; propoxylated (3) glyceryl triacrylate; trimethylolpropane triacrylate; propoxylated (5.5) glyceryl triacrylate; pentaerythritol triacrylate; propoxylated (3) glyceryl triacrylate; propoxylated (3) trimethylolpropane triacrylate; trimethylolpropane triacrylate; trimethylolpropane trimethacrylate; tris (2-hydroxy ethyl) isocyanurate triacrylate; di-trimethylolpropane tetraacrylate; dipentaerythritol pentaacrylate; ethoxylated (4) pentaerythritol tetraacrylate; pentaerythritol tetraacrylate; dipentaerythritol hexaacrylate; and combinations thereof.

Other functional monomers that may be included in the present inkjet compositions include, in amounts between 0 and 40 wt % based on the total inkjet composition, cyclic lactam such as N-vinyl caprolactam, N-vinyl oxazolidinone and N-vinyl pyrrolidone, and secondary or tertiary acrylamides such as acryloyl morpholine, diacetone acrylamide, N-methyl acrylamide, N-ethyl acrylamide N-isopropyl acrylamide, N-t-butyl acrylamide, N-hexyl acrylamide, N-cyclohexyl acrylamide, N-octyl acrylamide, N-t-octyl acrylamide, N-dodecyl acrylamide, N-benzyl acryl amide, N-(hydroxymethyl)acrylamide, N-isobutoxymethyl acrylamide, N-butoxymethyl acrylamide, N,N-dimethyl acrylamide, N,N-diethyl acrylamide, N,N-propyl acrylamide, N,N-dibutyl acrylamide, N,N-dihexyl acrylamide, N,N-dimethylamino methyl acrylamide, N,N-dimethylamino ethyl acrylamide, N,N-dimethylamino propyl acrylamide, N,N-dimethylamino hexyl acrylamide, N,N-diethylamino methyl acrylamide, N,N-diethylamino ethyl acrylamide, N,N-diethylamino propyl acrylamide, N,N-dimethylamino hexyl acrylamide, N,N'-methylenebisacrylamide, and combinations thereof. Of these, diacetone acrylamide is particularly preferred.

Exemplary water-soluble organic solvents that may be included in the inkjet compositions include mono-ether glycolic solvents, such as 3-methoxy-3-methyl-1-butanol (MMB), dipropylene glycol methyl ether (DPM), propylene glycol n-butyl ether (PnB), and di-ether glycolic solvents such as diethylene glycol diethyl ether (DEGDE), and dipropylene glycol dimethyl ether (DMM). These solvents may be used alone or in combination. Further, these solvents, alone or in combination, may be used with the humectant-type solvents such as propylene glycol (PG) and glycerol (Gly). MMB, DPM, PnB, DEGDE, and DMM have boiling points higher than 150° C. and heats of vaporization of less than 400 J/g. It is believed that the presence of these solvents in the inkjet compositions—alone or in combination with each other, and alone or in combination with humectant-type solvents such as PG and Gly—maintain stability of the inkjet composition during printing and increase ink viscosity. Solvents such as the alkyl ethers of glycols (ethylene glycol, diethylene glycol, triethylene glycol, propylene glycol, dipropylene glycol) may be included. The presence of these solvents in the inkjet compositions leads to a rapid drying of the ink after printing, thereby allowing for faster printing speeds than is otherwise possible with inkjet compositions that contain relatively large amounts of conventional humectant-type solvents. It is believed that this latter property enables inks comprising such solvents to dry much more rapidly after printing than is the case for comparable inks comprising conventional glycol solvents, such as glycerol and propylene glycol. These solvents, among other water-soluble organic solvents, can be formulated into compositions that comply with Formula I.

Other water soluble organic solvents that may be included in the inkjet compositions include those having a water solubility at 25° C. of greater than 3 wt %, a boiling point greater than 150° C., and a heat of vaporization of less than 400 J/g, such as for example, 3,3,5-triemthylcyclohexanone, which may be used in combination with other water-soluble organic solvents, such as those mentioned above. Other examples include tripropylene Glycol Methyl Ether, Propylene Glycol Methyl Ether Acetate, Dipropylene Glycol Methyl Ether Acetate, Propylene Glycol n-Propyl Ether, Dipropylene Glycol n-Propyl Ether, Dipropylene Glycol n-Butyl Ether, Propylene Glycol Phenyl Ether, Propylene Glycol Diacetate, Diethylene Glycol Ethyl Ether, Diethylene Glycol Methyl Ether, Diethylene Glycol n-Butyl Ether, Diethylene Glycol n-Butyl Ether Acetate, Ethylene Glycol Propyl Ether, Ethylene Glycol n-Butyl Ether, Ethylene Glycol Hexyl Ether, Ethylene Glycol n-Butyl Ether Acetate.

These solvents, among other water-soluble organic solvents, can be formulated into compositions that comply with Formula I.

The inkjet compositions described herein may be cured by any electromagnetic radiation source producing an actinic effect. Such sources include but are not limited to: electron-beam, ultraviolet (UV)-light, visible-light, infrared (IR), and microwave. When the compositions are cured under the action of UV light, suitable sources of curing UV energy include: low pressure mercury bulbs, medium pressure mercury bulbs, xenon bulb, excimer lamps, carbon arc lamps, metal halide bulbs, UV-LED lamps, or sunlight. It should be appreciated by those skilled in the art that any UV light source may be used to cure compositions prepared according to the current invention. Compositions of the current invention are especially suited for use in compositions curable under the action of UV light and/or electron-beam.

When the inkjet compositions described herein are cured under the action of UV-light, they preferably include one or more photoinitiators to initiate and/or propagate free radical polymerization. Water-soluble and water-dispersible photoinitiators are preferred, in particular 1-[4-(2-Hydroxyethoxy)-phenyl]-2-hydroxy-2-methyl-1-propane-1-one (available commercially as Irgacure 2959, from BASF) and derivatives thereof. The photoinitiators described in WO2015/183719 may be used in the present inkjet compositions. WO2015/183719 is incorporated herein by reference.

Just about any water-soluble or water-dispersible photoinitiator can be used in compositions of the current invention, and it is possible to disperse any water-insoluble photoinitiator into compositions of the current invention by any suitable method. Thus, the photoinitiator may be incorporated into the dispersed phase of monomer, oligomer or polymer component of the compositions of the present inkjet compositions. The photoinitiators may also be dispersed into the aqueous phase through the inclusion of surfactants. Again, the stable dispersions should have particle sizes preferably less than 1 micron.

Photoinitiators which may be included in the present inkjet compositions include, for example, acyl phosphine oxides, such as, 2,4,6-trimethylbenzoyl-diphenylphosphine oxide; 2,4,6-trimethylbenzoyl-diphenyl phosphinate; and bis(2,4,6-trimethylbenzoyl)-phenylphosphine oxide. Other possible photoinitiators include non-acid functional thioxanthone photoinitiators such as 2-4-diethylthioxanthone, isopropylthioxanthone, 2-chlorothioxanthone, 1-chloro-4-propoxythioxanthone, GENOPOL TX1 from Rahn, OMNIPOL TX from IGM or SPEEDCURE 7010 from Lambson; bis dialkylamino benzophenones such as 4 4,4-bis(diethylamino)benzophenone; anthraquinones such as 2-ethyl anthraquinone. Combinations of photoinitiators may be used.

It is also possible to use photoinitiators such as $\alpha$-aminoketones. Examples include, but are not limited to, 2-methyl-1-[4-(methylthio)phenyl]-2-morpholinopropan-1-one; 2-benzyl-2-dimethylamino-1-(4-morpholinophenyl)-butanone-1; 2-dimethylamino-2-(4-methyl-benzyl)-1-(4-morpholin-4-yl-phenyl)-butan-1-one; Omnirad 910 from IGM resins, and combinations thereof.

Other suitable photoinitiators that are water-soluble or water-dispersible which may be used include Irgacure 2959 (1-[4-(2-Hydroxyethoxy)-phenyl]-2-hydroxy-2-methyl-1-propane-1-one) and the thioxanthone type photoinitiators described in WO2015/183719. It should be noted that the compositions of the present invention can be cured under the action of any electromagnetic radiation source which produces an actinic effect, commonly termed "energy-curing". Where the compositions are cured under the action of UV light, then UV sources such as low pressure mercury bulbs, medium pressure mercury bulbs, a xenon bulb, excimer lamps, a carbon arc lamp, a metal halide bulb, a UV-LED lamp or sunlight can be used. The present ink jet compositions are especially suited for use in compositions curable under the action of UV light and/or electron-beam.

While any kind of photoinitiator or combination of photoinitiators may be included in the present inkjet compositions, in certain instances it is desirable to use photoinitiator species, alone and in combination, that do not migrate out of the ink after it is dried and cured, or migrate minimally. This is particularly the case when the inks are used to print articles used to package sensitive items, such as foods, drinks, pharmaceuticals, consumer products plant foods, and fertilizers, that are, for example, ingested by, injected into, topically applied to, inserted into, etc., a human being, other animal, or plant. Such non-migratable photoinitiators, and/or those which only migrate in levels determined to be acceptable, are exemplified later in this disclosure. In a preferred aspect, the present inkjet compositions do not comprise migratable materials in excess of 50 ppb, in accordance with the guidelines of the EuPIA.

In a preferred but not essential aspect of the present disclosure, after printing the present inkjet compositions on a substrate, at least a portion of the water and water-soluble organic solvents are removed prior to energy curing the compositions. Removal may be by evaporation, such as by exposing the printed inkjet compositions to heat or by evaporating at ambient temperature, such as room temperature, or at greater than room temperature. Any type of drying system which is effective in removing, e.g., evaporating, water and solvent prior to energy-curing may be employed. Evaporative drying processes include forced air drying ovens, infrared dryers, near infrared driers, heated plates, and microwave driers. In a preferred aspect, a majority of the water and water-soluble organic solvents are removed prior to energy curing.

The total amount of the one or more water-soluble organic solvents present in the describe inkjet compositions is 5 wt % to 40 wt %, based on the total inkjet composition, before drying. More preferably, the total concentration of any blend of organic co-solvent is in the range 5 wt % to 25 wt % of the total coating/ink composition.

In one aspect of the present disclosure, the value for $\rho$, as determined according to formula I, is less than or equal to 1,900,000 J·° C./g, and yet more preferably less than or equal to 1,800,000 J·° C./g.

In another inventive aspect, the dry film thickness of the present inkjet compositions after a single printing stage is less than 3.0 µm, preferably less than 2.5 µm, more preferably less than 2.0 µm.

Compared with the water-based inkjet compositions that are currently available, inks and coatings of the present disclosure have faster drying speeds, particularly when they are applied to impervious substrates such as plastic substrates. Also, the inkjet compositions possess improved re-solubility and open times in an inkjet printhead. Furthermore, when acrylated polyurethane dispersions are used, the total weight of the acrylated polyurethane by polymer weight is preferably 1 wt % to 20 wt % of the total composition, and more preferably, 1 wt % to 18 wt % thereof, and even more preferably, 1 wt % to 16 wt %.

The inkjet compositions described herein may be printed onto any printable substrate. They are particularly suited to the printing of impervious plastic substrates because of their faster drying speeds and the observed sustainable printability that they offer. Ink and coating compositions of the present invention are suitable for printing via multipass and single pass operations. Food packaging is one particular field in which the present inkjet compositions are useful. Food packaging may often be printed in single pass printing, an application for which the present inkjet compositions are well suited.

Compared with currently available compositions, inks and coatings of the present invention have a number of key advantages: e.g., faster drying times, particularly on impervious plastic substrates, improved pH stability, improved printing characteristics from inkjet print heads, notably improved start-up and improved open times. As well as these advantages, the inks and coatings of the current invention have been shown to be particularly suited to the printing of food packaging, since they exude little to no odor and include acceptably low levels of migratable components, which could cause unwanted contamination of packaged foods.

Fast printing speeds on commercial printing presses are attained when the present inkjet compositions are used, due to the faster drying times of such compositions. This remains the case event when the inks are printed on impervious plastic substrates.

The thinner films formed when printing the present inkjet compositions offer advantages not found in the currently available solvent-free 100 wt % solids UV-curable inkjet fluids. Lower film weight and the lesser amount of shrinkage that takes place after UV-curing provides for superior adhesion of the dried and cured inkjet composition to plastic substrates, and also, it allows for the printing of plastic films with thicknesses of less than 50 µm. The higher concentration of pigment in the dry ink films results in greater color development resulting in a broader color gamut than is achievable with 100% UV-curable inkjet compositions.

As mentioned above, the present inkjet compositions do not shrink to the same extent as the solvent-free 100% UV-curable inkjet compositions. When present inkjet compositions are applied to thin flexible substrates, such as 12 µm polyester film, and then dried and cured, there is no observable distortion (e.g., curling) of the printed film. When the same is done with conventional (solvent-free) UV-curable inkjet compositions, there is significant distortion as evidenced by curling. The thinner (dry) film weight depositions of the compositions of the present inkjet compositions with 100% UV-curable inkjet compositions, provides greater flexibility in the manufacturing process.

Compared with currently available water-based inkjet compositions that contain resins, inks of the current invention demonstrate superior resolubility and hence superior printing reliability. This is believed to be due to the superior resolubility of acrylated polyurethane dispersions compared with conventional water-based polymer dispersions, such as acrylic and polyurethane emulsions. The UV-curing water-based inks and coatings disclosed herein make printed articles having superior solvent resistance compared with conventional water-based inks and coatings. Further, the water-based UV-curable inks and coatings disclosed herein exhibit superior solvent resistance when compared with solvent-based inkjet compositions. Compared with solvent-based UV-curable inkjet compositions, the use of water as the predominant solvent in compositions of the current invention ensures that inks and coatings of the current invention are considerably more environment-friendly, due to the water base of the inkjet compositions.

By providing inkjet compositions having a water-soluble organic solvent profile that complies with Formula 1, e.g., $\rho$ is less than or equal to 2,000,000, the resulting ink jet compositions exhibit have superior drying characteristics and exhibit the desired resolubility and printing reliability required of such inkjet compositions, particularly when applied to impervious substrates, such as plastic substrates. By using water-soluble organic solvents having boiling points of 150° C. or greater (preferably 160° C. or greater) which have heats of vaporization of 400 J/g or less, alone or in combination with limited amounts of solvents that exceed each of the stated values for boiling point and heat of vaporization, as indicated previously, it is possible to achieve inks that dry printable at commercially desirable printing speeds.

In addition to the water-soluble or water dispersible component that is polymerizable by free radical polymerization, e.g., a polymer with functional groups polymerizable by free radical polymerization, the inkjet compositions described herein may further comprise one or more monomers, oligomers and polymers that are polymerizable by free radical polymerization, e.g., under the action of electromagnetic radiation, such as by exposure to UV energy. In a preferred aspect, the free radical polymerizable monomers, oligomers and polymers include chemical structures that polymerize by free radical polymerization processes.

In a preferred aspect, the water-soluble or water dispersible component and/or the monomers, oligomers, and polymers that may be present in the inkjet compositions may include free radically polymerizable groups exemplified by the following functional chemical groups; acrylate, methacrylate, acrylamide, methacrylamide, ethylenic, vinyl-ether, propenyl ether, vinyl-ester, maleate, and fumarate. The components possessing these groups may be water-soluble or water-dispersible. In a particularly preferred aspect, acrylated polyurethane dispersions are employed in the inkjet compositions.

The ink jet compositions described herein can be used to print articles in multipass and single pass inkjet printing processes. In one aspect, the inventive compositions can be used in single pass printing operations of food packaging and other sensitive applications, such as packaging for pharmaceutical goods, personal care items, and other materials.

In another inventive aspect, the major portion of the solvent component of the present inkjet compositions is water, with the water-soluble organic solvent being a minor portion of the total solvent content of the inkjet compositions.

The water included in the present inkjet compositions preferably does not contain ionic impurities. Preferably the water is ion exchange water, distilled water, and a combination of same. The quantity of water present in the inkjet compositions described herein, including that which, for example, may be provided by materials, such as a commercially available formulation of an acrylated polyurethane dispersion, is preferably 20 wt % to 90 wt %, more preferably 30 wt % to 80 wt %, based on the total inkjet composition.

The total amount of the water-soluble organic solvents present in the disclosed inkjet compositions is preferably 1 wt % to 40 wt %, more preferably 5 wt % to 25 wt %, based on the total inkjet composition. The inkjet compositions of the present invention comprise any blend of solvents according to Formula I. It is also preferred that a portion of the water-soluble organic solvents be humectant-type solvents as aforedescribed, in order to prevent premature drying of the ink in the inkjet heads, which in turn prevents the inks from clogging the flow paths in the inkjet head. Further, humectant-type solvents can act as a wetting aid, allowing the inkjet drops to spread upon deposition on the substrate.

Examples of suitable solvents include alkylene glycol ethers and ether acetates, including those exemplified by the following: 4-hydroxy-4-methyl-2-pentanone, diethylene glycol butyl ether, diethylene glycol ethyl ether, diethylene glycol methyl ether, diethylene glycol monoethyl ether acetate, diethylene glycol monopropyl ether, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, propylene glycol, propylene glycol ethyl ether, propylene glycol ethyl ether acetate, propylene glycol methyl ether, propylene glycol n-propyl ether, triethylene glycol butyl ether, triethylene glycol methyl ether, and combinations thereof.

The compositions of the present invention may also optionally include other materials, such as for example, pigments, dyes, biocides, surfactants, slip additives, wetting additives, anti-blocking aids, organic bases such as amines and inorganic bases such as sodium hydroxide.

An amine synergist may be included in the present inkjet compositions. Exemplary amine synergists include: aliphatic alkanolamines such as triethanolamine, N-methyl ethanolamine and N,N-dimethyl ethanolamine; and aminoacrylates such as EBECRYL 80/81/83/85/880/841/7100/P116, and EBECRYL LEO 10551/10552/10553, available from Allnex; CN 501/550/3705/3715/3735/3755/381/386 and UVA421, all available from Sartomer; Photomer 4967/4775/4969/5006/5662/5930/5960, all available from IGM Resins; GENOMER 5142, 5161, 5171 and 5275 from Rahn; LAROMER LR8996, LR8997, LR8869, LR8889, PO 83F, PO 84F and PO 94F all available from BASF; and combinations thereof. Aromatic aminobenzoate esters are also possible, but less desirable than alkanolamines and aminoacrylates, because of their lower water solubility. Examples include ethyl-4-(dimethylamino) benzoate, 2-ethylhexyl-4-(dimethylamino) benzoate, 2-(dimethylamino) ethylbenzoate, and polymeric aminobenzoates such as OMNIPOL ASA from IGM Resins, GENOPOL AB1/AB2 from Rahn, and SPEEDCURE 7040 from Lambson, and combinations thereof. The inclusion of compounds having tertiary amine and acidic functionalities is also possible, as they may regulate the pH of the inkjet composition and maintain the amount of amine synergist to an acceptable level, such as for reaction with a thioxanthone photoinitiator that may be present in the inkjet composition. Such compounds include isomers of N,N-dialkylaminobenzoic acids, N,N-dimethyl-glycine, and isomers of N,N-dialkylaniline sulphonic acids. Of these, 4-(dimethylamino)benzoic acid is particularly preferred.

Since the present inkjet compositions are water-based, the inclusion of a biocide or anti-mold agent may be advantageous. Suitable examples include the following biocide structural types: benz-isothiazolinone, bromo-nitro-propane-diol, isothiazolinone, ethylenedioxydimethanol, or iodo-propynyl butyl carbamate, which are marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). Biocide components are preferably present in an amount of 0.01 wt % to 1.00 wt % based on the total weight of the inkjet composition.

Defoamers may also be included in the present inkjet compositions. Defoamers prevent the formation of foam during manufacture of the ink composition and also during jetting. Defoamers are particularly useful when the inks are deposited through recirculating print heads. Examples of suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives, also known as surfactants, can be included in the inkjet compositions to adjust the surface tension of the ink, which in turn adjusts the wetting of the inkjet composition on the face plate of the print head. Surface control agents also help attain the desired drop spread of the deposited ink on the substrate, and, in the case of multipass inkjet printing, they help attain desirable wet-on-dry drop spread. Surface control additives may also control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODAFLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

De-aerators may also be included in the present inkjet compositions to prevent the formation of air inclusions and pinholes in the dried and cured ink after printing. De-aerators also reduce rectified diffusion, which can cause reliability issues in the printhead. Examples of de-aerators include the following products available from Evonik: TEGO AIREX 900, 910, 916, 920, 931, 936, 940, 944, 945, 950, 962, 980, and 986.

The present inkjet compositions may optionally contain one or more colorants, such as pigments, dyes, and combinations thereof. Examples of suitable organic or inorganic pigments include carbon black, zinc oxide, titanium dioxide, phthalocyanine, anthraquinones, perylenes, carbazoles, monoazo and di sazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, and combinations thereof.

Commercial organic pigments classified according to Color Index International may be included in the present inkjet compositions, such as, those according to the following trade designations: blue pigments PB1, PB15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6. Combinations of the above may be employed.

In a preferred aspect, the pigments included in the present inkjet compositions are milled to a particle size that is less than 1 micrometer, and after milling, have a preferred particle size distribution of 10-500 nm, more preferably 10-350 nm, so as to provide the present inkjet compositions with better transparency and a wide color gamut.

To incorporate the above-described pigments into the present inkjet compositions, it is preferred that the pigments be manufactured and stably stored as pigment dispersions in water. This is may be achieved by dispersing the pigment into a water-soluble or water-dispersible resin using a water-soluble and/or a water-dispersible surfactant, which introduces hydrophilic functional groups into the surface of the pigment particles. Examples of such dispersing resins include but are not limited to polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. Examples of the salts include sodium hydroxide, potassium hydroxide and salts of basic compounds such as ammonia, ethylamine, diethanolamine, triethanolamine, propylamine, isopropylamine, dipropylamine, butylamine, isobutyl amine, diethanolamine, triethanolamine, triisopropanolamine, dimethyl ethanolamine, amino methyl propanol, and morpholine. The amount of the basic compound is not limited so long as the resin dispersant is equal to or more than the neutralization equivalent. Combinations of the above may be used.

Examples of surfactants used in the pigment dispersions include anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol. Combinations of the above may be used.

The present inkjet compositions are suitable for printing by either multipass or single-pass operations. In the case of multipass printing, the present ink jet compositions may be applied to any flexible or rigid substrate, including plastics films and sheets, metal surfaces, glass surfaces, wood surfaces paper, and paperboard. For multipass printing with the present ink jet compositions, both sheet-fed and roll-fed printing can be employed. For multipass printing of plastic films and sheets, the present ink jet compositions may be printed the following exemplary substrate materials; vinyl, acrylic, polystyrene, polycarbonate, polyester, and poly (olefin).

In the case of printing via single-pass operation, the present ink jet compositions are particularly suited to printing onto flexible plastic films, flexible aluminum foils, and paperboard substrates. In the case of flexible plastic films, exemplary plastic surfaces include polyester, nylon, polypropylene, polyethylene, cellulose acetates, poly(lactic acid), and polystyrene. The present ink jet compositions may be applied by single pass operation to any coating applied to the aforementioned flexible films, such as aluminum, aluminum oxide, silicon oxide, poly(vinylidene dichloride), acrylic, and nitrocellulose. Compositions of the current invention may be applied by single pass operation to plastic laminate films that comprise two or more layers of for example, combinations of the previously mentioned plastic and aluminum films. Substrates printed with compositions of the current invention may subsequently be overprinted with ink or coatings or laminated to a second film. Where printed matter using compositions of the current invention are laminated to second films (or additional films), then any suitable lamination process may be employed, including adhesive and thermal lamination.

The present inkjet compositions, when printed by single pass processes, are especially suited to the printing of substrates intended for the packaging of food, pharmaceuticals and other sensitive applications.

The following are examples of specific inkjet compositions in accordance with the present disclosure and a showing of properties possessed by same. It is to be understood that these examples are not intended to limit the scope of the disclosure to the explicit descriptions of the exemplary compositions, and they should not be construed in a limiting manner.

EXAMPLES

To demonstrate the effect that various solvent blends have on the drying speed of the present inkjet compositions, inks were prepared using the following exemplary solvents listed in Table 1.

TABLE 1

Solvents used in the Preparation of Water-based UV-Curable Inkjet Inks

| Solvent (abbreviation) | Boiling Point (° C.) | Heat of Vaporization (J g$^{-1}$) |
|---|---|---|
| Glycerol (Gly) | 290 | 990 |
| Propylene Glycol (PG) | 187 | 881 |
| Dipropylene glycol methyl ether (DPM) | 190 | 267 |
| Propylene Glycol Butyl Ether (PnB) | 171 | 320 |
| 3-Methoxy-3-methyl-1-butanol (MMB) | 176 | 384 |
| Diethylene Glycol diethyl ether (DEGDE) | 189 | 314 |
| Dipropylene glycol dimethyl ether (DMM) | 175 | 257 |

Inks were then prepared according to the composition as set forth in Table 2:

TABLE 2

Inkjet Ink Composition Formulas for Table 3 Examples

| Component | Concentration (wt %) |
|---|---|
| Deionized water | 18.6-48.6 |
| Solvent(s) | 0 & 13.0-30.0 |
| Neorad R448[1] | 30.0 |
| Cyan Dispersion[2] | 20.0 |
| N-Methyl Diethanolamine[5] | 0.4 |
| Irgacure 2959[3] | 0.8 |
| Tegowet KL245[4] | 0.2 |

Notes to Table 2:
[1]Neorad R448 - Acrylated Polyurethane Dispersion, from DSM.
[2]Cyan Dispersion - Aqueous dispersion of Cyan 15:4 having a pigment concentration of 15 wt %.
[3]Irgacure 2959 - Water soluble photoinitiator, from BASF.
[4]Tegowet KL245 - Polyether siloxane copolymer, from Evonik, included as a substrate wetting additive.
[5]N-methyl diethanolamine is included to adjust the pH of the ink to be alkaline (pH = about 8.5).

The inkjet compositions were prepared by mixing the components with a Silverson disperser for 5 minutes before assessing ink drying time.

The inks were then applied at 8 μm thickness to 23 μm Melinex 813 (polyester film from Hi-Fi Films) using a calibrated K-Bar (from RK Print). Prior to coating with ink, the polyester film was placed on a K Control Coater, fitted with a heated bed held at 50° C. (from RK Print). The drying time of the inks corresponds to the time period beginning when the inks are deposited on the substrate and ending when the inks become touch dry, with no apparent tack.

The solvent compositions of the ink examples, along with their ρ values and drying times are provided in Table 3 below.

TABLE 3

Solvent Compositions of the Ink Examples and their Drying Times

| Ink | Solvent n = 1 | Solvent n = 2 | Solvent n = 3 | ρ/(1 × 10$^6$) | Drying Time |
|---|---|---|---|---|---|
| Control Example (No Solvent) | — | — | — | — | 30-45 sec |
| Comparative Example 1 | 15% Gly | — | — | 4.31 | >20 min |
| Comparative Example 2 | 20% PG | — | — | 3.29 | 15 min |
| Comparative Example 3 | 15% PG | — | — | 2.47 | 9 min |
| Comparative Example 4 | 15% PG | 5% MMB | — | 2.81 | 10 min |
| Comparative Example 5 | 10% PG | 10% MMB | — | 2.32 | 7 min |
| Inventive Example 1 | 5% PG | 15% MMB | — | 1.84 | 180 sec |
| Inventive Example 2 | 2.5% PG | 17.5% MMB | — | 1.59 | 105 sec |
| Inventive Example 3 | 20% MMB | — | — | 1.35 | 75 sec |
| Inventive Example 4 | 15% MMB | — | — | 1.01 | 45-60 sec |
| Inventive Example 5 | 15% DPM | — | — | 0.76 | 120 sec |
| Inventive Example 6 | 15% DEGDE | — | — | 0.89 | 60 sec |
| Inventive Example 7 | 15% DMM | — | — | 0.68 | 60 sec |
| Inventive Example 8 | 20% MMB | 5% DEGDE | — | 1.65 | 75 sec |
| Inventive Example 9 | 20% MMB | 7.5% DEGDE | — | 1.80 | 90 sec |
| Inventive Example 10 | 20% MMB | 10% DEGDE | — | 1.95 | 90 sec |
| Inventive Example 11 | 15% MMB | 7.5% DEGDE | — | 1.46 | 75 sec |
| Inventive Example 12 | 10% MMB | 3% PnB | — | 0.67 | 60 sec |
| Inventive Example 13 | 10% DPM | 7.5% DEGDE | 7.5% DMM | 1.29 | 75 sec |

The results in Table 3 show that ink jet compositions including water-soluble organic solvents that comply with Formula I, e.g., have values of ρ of less than or equal to 2,000,000, dry significantly faster than compositions that have values of ρ that exceed 2,000,000. Further, this is demonstrated to be the case when the inkjet compositions are applied to impervious substrates, such as plastic films. This is beneficial for multipass and single pass printing processes, where the highest possible throughput is sought.

Table 3 further shows that by controlling, e.g., limiting, the concentration of polyol solvents, such as glycerol and propylene glycol, faster drying times are possible for the present inkjet compositions.

A further advantage associated with the use of the alkyl ether solvents, such as DPM, PnB, MMB, DEGDE and DMM is that they surprisingly increase the viscosity of the inks. Table 4 provides the viscosities for the ink compositions comprising 15 wt % or 20 wt % of water-soluble organic solvents:

TABLE 4

Solvent Composition and Impact on Viscosity

| Example | Viscosity (mPa · s) |
| --- | --- |
| Control Example | 1.9 |
| Comparative Example 1 | 2.6 |
| Comparative Example 2 | 3.3 |
| Comparative Example 3 | 2.9 |
| Comparative Example 4 | 3.8 |
| Comparative Example 5 | 3.9 |
| Inventive Example 1 | 4.4 |
| Inventive Example 2 | 4.9 |
| Inventive Example 3 | 7.3 |
| Inventive Example 4 | 3.4 |
| Inventive Example 5 | 3.5 |
| Inventive Example 6 | 3.8 |
| Inventive Example 7 | 3.3 |

Notes to Table 4:
The viscosities of the inks at 32° C. were measured using a Brookfield DV-II+ Pro Viscometer equipped with Spindle no. 18 at 100 rpm.

For inkjet compositions comprising 15 wt % of an individual water soluble organic solvent, Table 4 shows that the inventive inkjet compositions of Examples 4, 5, 6 and 7, which comprise the alkyl ether solvents MMB, DPM, DEGDE and DMM, have higher viscosities than the inkjet compositions including glycerol or propylene glycol (Comparative Examples 1 and 3). This is a surprising finding, given the innately higher viscosity of glycerol or propylene glycol. In addition to the faster drying times exhibited by the inkjet compositions of Examples 4, 5, 6 and 7, this surprising finding is also beneficial in the formulation of inks.

Inventive Examples 14 and 15

To demonstrate that inkjet compositions prepared according to the current invention also print reliably from drop-on-demand printheads, the following inks were prepared. The compositions of these inks and their viscosities are provided in Table 5:

TABLE 5

Compositions for Inkjet Compositions

| Component | Inventive Example 14 | Inventive Example 15 |
| --- | --- | --- |
| Deionized water | 32.65 | 37.65 |
| DPM (solvent n = 1) | 10.0 | 12.5 |
| PnB (solvent n = 2) | 3.0 | 3.0 |
| Triethanolamine | 0.4 | 0.4 |
| Trimethylolpropane | 2.5 | — |
| Neorad R448 | 30.0 | 30.0 |
| Irgacure 2959 | 0.8 | 0.8 |
| Acticide MBS[1] | 0.1 | 0.1 |
| Tegowet KL245 | 0.5 | 0.5 |
| Agitan 120[2] | 0.05 | 0.05 |
| Yellow Dispersion[3] | 20.0 | — |
| Black Dispersion[4] | — | 15.0 |
| Total | 100.00 | 100.00 |
| Viscosity at 35° C. (mPa · s) | 4.2 | 4.5 |
| ρ/(1 × 10$^6$) | 0.67 | 0.80 |
| Drying Time at 50° C. (s) | 60 | 75 |

Notes to Table 5:
[1]Acticide MBS - Biocide, from Thor.
[2]Agitan 120 - Defoamer, from Munzing.
[3]Yellow Dispersion - Aqueous dispersion of Yellow 74 having a pigment concentration of 15 wt % in the dispersion.
[4]Black Dispersion - Proprietary aqueous dispersion of black pigment (Nipex 180 IQ, from Degussa) having a pigment concentration of 15 wt %.

The inkjet compositions of inventive Examples 14 and 15, after filtration to remove any oversized particles, were jetted from a Samba 3GL print head (from Fujifilm Dimatix). The inkjet compositions jetted reliably with no start-up or open time problems nor any misdirection of jetting. The inkjet compositions of inventive Examples 14 and 15 demonstrate that it is possible to prepare inkjet compositions according to the current disclosure which are stable under actual printing conditions and which deliver faster drying times than is otherwise possible with currently available compositions.

Examples of Low Migration Ink Jet Compositions

Inkjet compositions, according to the current invention, were prepared that include photoinitiator species combinations, including those suitable for low migration applications. The low migration photoinitiators used in this study are listed in Group 1A and Group 1B of the European Printing Ink Association (EuPIA) Suitability List of Photoinitiators for Low Migration UV Printing Inks and Varnishes.

Apart from Irgacure 2959, most of the photoinitiators employed in these examples are insoluble, or sparingly soluble, in water. In order to render the photoinitiators compatible for inclusion in the inkjet compositions according to the present description, the photoinitiators were first dissolved in a monomer and then dispersed in water using a blend of non-ionic surfactants.

After blending, the inks were printed, dried, and UV-cured. The amounts of migratable species were determined for the inks following the testing procedures laid out in the EuPIA Guideline on Printing Inks.

Preparation of the Photoinitiator Dispersions

The composition of the photoinitiator dispersions are provided in Table 6. The photoinitiators were dissolved in Photomer 4771 at 70° C., an aminoacrylate (from IGM Resins), along with the two non-ionic surfactants (Tween 60 and Brij O2 (from Croda)), also at 70° C., with mixing in a Silverson L5 lab mixer at 3000 rpm. Once these components were blended, water at 70° C. was added and the mixer speed was increased to 7500 rpm. Further blending took place for 5 minutes.

TABLE 6

Composition of the Photoinitiator Emulsions

| Photoinitiators and other Blend Components | PI1 | PI2 | PI3 | PI4 | PI5 |
|---|---|---|---|---|---|
| Photomer 4771[1] | 16.7 | 16.7 | 16.7 | 16.7 | 20.1 |
| Omnipol TX[2] | 5.6 | — | — | — | 4.0 |
| Omnirad 819[3] | — | 5.6 | — | — | 2.0 |
| Esacure KIP 160[4] | — | — | 5.6 | — | 2.0 |
| Omnirad 500[5] | — | — | — | 5.6 | — |
| Tween 60[6] | 7.8 | 7.8 | 7.8 | 7.8 | 8.0 |
| Brij O2[7] | 3.3 | 3.3 | 3.3 | 3.3 | 3.4 |
| Deionised water | 66.6 | 66.6 | 66.6 | 66.6 | 60.5 |

Notes to Table 6

[1]Photomer 4771; an acrylated amine synergist, from IGM Resins.
[2]Omnipol TX; a polymeric photoinitiator (Di-ester of carboxymethoxy thioxanthone and polytetramethyleneglycol 250, available from IGM Resins, having a specific migration limit of 50 ppb. Migration limits are provided for in the EuPIA guidelines mentioned above.
[3]Omnirad 819; an acylphosphine oxide, from IGM Resins, having a specific migration limit of 3300 ppb.
[4]Esacure KIP 160; a difunctional hydroxyl-ketone photoinitiator, from IGM Resins, having a specific migration limit of 50 ppb.
[5]Omnirad 500; a liquid blend of Omnirad BP (benzophenone) and Omnirad 184 (hydroxyl-ketone photoinitiator), from IGM Resins, not suitable for low migration printing applications.
[6]Tween 60, Polyoxyethylene sorbitan monostearate, from Croda.
[7]Brij O2, Ethoxylated Oleyl alcohol, from Croda.

Ink Preparation

The inks were prepared by mixing the components set forth in Table 7 followed by blending for 2 minutes using a Silverson L5 mixer at 2500 rpm. The amount of the photoinitiator emulsion was adjusted to ensure that an equivalent concentration of 0.5 wt % of photoinitiator was achieved in each ink.

Printing and Curing the Inks

The inks were applied to 23 μm Melinex 813 (polyester film, from Hi-Fi Films) at 8 μm using a calibrated K-Bar (from RK Print). The inks were then dried for 5 seconds using a hot air blower before being UV-cured using a Fusion UV Systems UV-Rig equipped with a medium pressure H-bulb. The belt speed was adjusted so that the UV-dose, as measured by a calibrated International Light Technologies ILT 490 Profiling Belt Radiometer (covering the UV-A and UV-B ranges), was 200 mJ/cm$^2$.

Assessing the Level of Migratable Species (Inks M1 to M6)

As noted above, ink M7, which comprised 15% propylene glycol, having a $\rho$=2,470,000, did not dry effectively prior to the UV-curing step, resulting in a tacky, poorly cured ink print. Therefore, the print of ink M7 was not tested further, as it contained excessive residual propylene glycol. Indeed, when attempts at blocking the print to LDPE were made, a significant part of the wet, poorly cured ink transferred to the LDPE film.

The amount of potential contamination from prints of inks M1 to M6 was determined by a set-off migration test. This test involved blocking 90 cm$^2$ of the printed surface with a 30 micron thick sheet of LDPE (low density polyethylene). The blocked print stack was placed under 5 tons of weight for 24 hours at room temperature. The blocked print stack was then stored for a further 10 days at 40° C. under a 5 Kg load. The LDPE film was removed from the blocked print stack and placed into 2 ml of methanol containing 7.5 ppm of 4-methoxyphenol (MEHQ) stabilizer for 10 days at 40° C. hours, in order to extract ink components that have migrated from the printed polyester film to the LDPE blocking film.

TABLE 7

Ink Compositions for Set-Off Migration Testing

| Ink Example | M1 | M2 | M3 | M4 | M5 | M6 | M7[c] |
|---|---|---|---|---|---|---|---|
| Deionized water | 44.0 | 35.5 | 35.5 | 35.5 | 35.5 | 38.2 | 39.0 |
| TegoWet KL245 | 0.5 | 0.5 | 0.5 | 0.5 | 0.5 | 0.5 | 0.5 |
| DPM | 8.0 (n = 1) | 8.0 (n = 1) | 8.0 (n = 1) | 8.0 (n = 1) | 8.0 (n = 1) | 8.0 (n = 1) | — |
| PnB | 2.0 (n = 2) | 2.0 (n = 2) | 2.0 (n = 2) | 2.0 (n = 2) | 2.0 (n = 2) | 2.0 (n = 2) | — |
| Propylene glycol (PG) | — | — | — | — | — | — | 15.0 (n = 1) |
| Neorad R441[a] | 35.0 | 35.0 | 35.0 | 35.0 | 35.0 | 35.0 | 35.0 |
| Aqueous Cyan Dispersion A[b] | 10.0 | 10.0 | 10.0 | 10.0 | 10.0 | 10.0 | 10.0 |
| Irgacure 2959 | 0.5 | — | — | — | — | — | 0.5 |
| PI1 | — | 9.0 | — | — | — | — | — |
| PI2 | — | — | 9.0 | — | — | — | — |
| PI3 | — | — | — | 9.0 | — | — | — |
| PI4 | — | — | — | — | 9.0 | — | — |
| PI5 | — | — | — | — | — | 6.3 | — |

Notes to Table 7

[a]The $\rho$ values for M1-M6 are $\rho$ = 0.52/(1 × 10$^6$).

[b]Neorad R441; an acrylated polyurethane dispersion, from DSM.

[c]Aqueous Cyan Dispersion A is a proprietary dispersion of cyan 15:4 having a pigment concentration of 28.0 wt %.

d. Ink M7, comprising 15% propylene glycol, did not dry properly during the 5 second drying cycle that takes place prior to the UV-curing step. Ink M7 was a highly tacky ink print which did not allow a set-off migration test to be completed.

Such components include water-soluble organic solvents and photoinitiator. The methanol solution was then analyzed by GC-MS for to determine the migrating components and the amounts thereof. The results are reported in Table 8 as ppb. The reported values represent the amount of migratable material that would be present in 1 kg of food according to the EU packaging model, where it is assumed that 600 cm² of substrate is required to package 1 kg of food.

TABLE 8

Results for Set-Off Migration Testing

| Ink | Migratable Solvents n = 1, n = 2 | Migratable Photoinitiator Components | Migratable HDDA[1] (ppb) |
|---|---|---|---|
| M1 | None detected | 1-2 ppb Irgacure 2959 decomposition product. No Irgacure 2959 detected. | <1.0 |
| M2 | None detected | No photoinitiator detected | <1.0 |
| M3 | None detected | <1.0 ppb mesitaldehyde (a decomposition product of Omnirad 819) No Omnirad 819 detected | 22.1[2] |
| M4 | None detected | No KIP 160 detected. | 1.0 |
| M5 | None detected | 460 ppb Benzophenone 170 ppb Omnirad 184 | <1.0 |
| M6 | None detected | <1.0 ppb mesitaldehyde No photoinitiators detected | <1.0 |

Notes to Table 8
[1]HDDA = Hexanediol diacrylate, a component of the amine synergist Photomer 477.
[2]Omnirad 819 did not fully dissolve into the Photomer 4771 and surfactant blend resulting in a coarse photoinitiator dispersion. This may account for the poor cure of ink M3.

Regarding the migratable solvents, Table 8 shows that the inkjet compositions of the present disclosure dry with sufficient speed so that there little or no retained solvent remaining in the print (thus, there is no solvent that can potentially migrate). This is consistent with the ρ values disclosed herein for solvent combinations.

The results in Table 8 show that when migratable species are a factor in formulating an ink, such as when the ink is used in food packaging, photoinitiators such as benzophenone and Omnirad 184 (1-hydroxycyclohexyl-phenyl ketone) may not be the best choice when an ink is used to print food packaging articles. These components are contained in Esacure KIP 160 and Omnirad 500. Both these photoinitiators migrated from the cured ink print into the LDPE film. Furthermore, the print of ink M5 had a distinct odor associated with benzophenone.

In the cases where all, or the majority, of the photoinitiator dissolved into the Photomer 4771-surfactant blend, the inks cured well with little or no uncured HDDA being detected in the methanol extracts. In the case of ink M3, where the Omnirad 819 was poorly soluble in the Photomer 4771-surfactant blend, the amount of uncured HDDA was significantly higher. The inks M3 and M6, which comprise Omnirad 819, formed prints having very low levels of migratable mesitaldehyde, which is a principal decomposition product from Omnirad 819. In both cases no migratable Omnirad 819 was detected.

Irgacure 2959, the only water-soluble photoinitiator used in this series of experiments, was not detected as a migratable component. However, a very low level of the aldehyde decomposition product, 1-2 ppb, was detected, which is below the required 10 ppb level as stipulated by the EUPIA guidelines.

Other than the photoinitiators and HDDA, no other migratable components deriving from the cured inks were detected. This may be due to the polymeric nature of the acrylated polyurethane dispersion and other components of the ink.

The present inkjet compositions have been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A free radically polymerizable water-based inkjet composition comprising:
    water;
    a water-soluble or water-dispersible component polymerizable by free radical polymerization; and
    one or more water-soluble organic solvents in compliance with following Formula I:

$$\Sigma(X_n \cdot H_n \cdot B_n) \leq \rho \qquad (I)$$

wherein each individual n represents a water-soluble organic solvent present in the composition;
    n is an integer ≥1;
    $X_n$ is the amount on a weight basis of each water-soluble organic solvent present in the composition expressed as $100(w_n/w_{total})$;
    $w_n$ is the weight of a water-soluble organic solvent present in the composition represented by a value of n;
    $w_{total}$ is the weight of the ink jet composition;
    $H_n$ is Heat of Vaporization of each water-soluble organic solvent (J/g);
    $B_n$=Boiling Point of each water-soluble organic solvent (° C.);
    Σ=sum of the multiplication products of $X_n$, $H_n$ and $B_n$ for each water-soluble organic solvent present in the composition; and
    ρ is 2,000,000;
    wherein the total amount of water-soluble organic solvents in the composition is 10 wt % to 40 wt %, based on the total weight of the composition; and wherein the composition comprises less than or equal to 2.5 wt % water-soluble organic solvents having boiling points of 150° C. or greater and heats of vaporization of equal to or greater than 400 J/g.

2. The composition of claim 1, wherein the water-soluble or water-dispersible component comprises water-dispersible acrylated polyurethane polymerizable by free radical polymerization.

3. The composition of claim 2, wherein the water-dispersible acrylated polyurethane has a weight average molecular weight of 500 to 50,000 Daltons.

4. The composition of claim 1, further comprising one or more monomers, oligomers and polymers that are polymerizable by free radical polymerization selected from acrylate, methacrylate, acrylamide, methacrylamide, ethylenic, vinyl-ether, propenyl ether, vinyl-ester, maleate, fumarate, and combinations thereof.

5. The composition of claim 1, wherein the boiling point of each of the one or more water-soluble organic solvents present in the composition is 150° C. or greater.

6. The composition of claim 5, wherein the amount of the one or more water-soluble organic solvents having boiling points of 150° C. or greater is 5 wt % to 30 wt %, based on the total weight of aqueous inkjet compositions.

7. The composition of claim 1, wherein the total amount of the one or more water-soluble organic solvents having boiling points of 150° C. or greater and heats of vaporization of 400 J/g or greater is, based on the total weight of the composition, 0.01 wt % to 2.5 wt %.

8. The composition of claim 1, wherein the one or more water soluble organic solvents are selected from alkylene glycol ethers and ether acetates selected from 4-hydroxy-4-methyl-2-pentanone, diethylene glycol butyl ether, diethylene glycol ethyl ether, diethylene glycol methyl ether, diethylene glycol monoethyl ether acetate, diethylene glycol monopropyl ether, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, propylene glycol, propylene glycol ethyl ether, propylene glycol ethyl ether acetate, propylene glycol methyl ether, propylene glycol n-propyl ether, triethylene glycol butyl ether, triethylene glycol methyl ether, tripropylene glycol, tripropylene glycol methyl ether, and combinations thereof.

9. The composition of claim 1, wherein the water-soluble or water-dispersible component comprises water-dispersible acrylated polyurethane polymerizable by free radical polymerization, wherein the water-dispersible acrylated polyurethane is present in the composition, based on the weight of the polyurethane and the total weight of the composition, in an amount of 2.0 wt % to 20 wt %.

10. The composition of claim 1, wherein the water-soluble organic solvent comprises glycerol, propylene glycol, 3-methoxy-3-methyl-1-butanol, dipropylene glycol methyl ether, propylene glycol n-butyl ether, diethylene glycol diethyl ether, dipropylene glycol dimethyl ether, 3,3,5-triemthylcyclohexanone, and combinations thereof.

11. The composition of claim 1, further comprising one or more photoinitiators.

12. The composition of claim 11, wherein the one or more photoinitiators are water-soluble or dispersible in an aqueous phase.

13. The composition of claim 11, wherein the amount of migration of photoinitiator from the printed substrate to another material is less than 50 ppb.

14. A method for printing an article comprising:
   printing, by inkjet printing, the composition of claim 1 on a substrate;
   removing at least a portion of the water and organic solvent from the composition; and
   energy curing the composition.

15. The method of claim 14, wherein energy curing comprises exposing the article to UV light or electron beam radiation.

16. The method of claim 14, wherein the printed article is food packaging.

17. A printed article comprising
   a substrate; and
   at least one printed layer comprising the composition of claim 1.

18. The printed article of claim 17, wherein the film thickness of a single printed layer, before the energy curing step, is less than 3.0 µm.

19. The printed article of claim 17, wherein the substrate is comprised of a material selected from vinyl, acrylic, polystyrene, polycarbonate, polyester, polyethylene terephthalate, glycol modified polyethylene terephthalate, poly(olefin), nylon, polypropylene, polyethylene, cellulose acetates, poly(lactic acid), aluminum, aluminum oxide, silicon oxide, poly(vinylidene dichloride), and nitrocellulose.

20. A method for printing an article, consisting essentially of:
   a) providing a substrate;
   b) providing a free-radically polymerizable water-based inkjet composition, wherein the free-radically polymerizable water-based inkjet composition comprises:
      i. water;
      ii. a water-soluble or water-dispersible component polymerizable by free radical polymeration; and
      iii. one or more water-soluble organic solvents in compliance with following Formula I:

$$\Sigma(X_n \cdot H_n \cdot B_n) \leq \rho \qquad (I)$$

wherein each individual n represents a water-soluble organic solvent present in the composition;
      n is an integer $\geq 1$;
      $X_n$ is the amount on a weight basis of each water-soluble organic solvent present in the composition expressed as $100(w_n/w_{total})$;
      $w_n$ is the weight of a water-soluble organic solvent present in the composition represented by a value of n;
      $w_{total}$ is the weight of the ink jet composition;
      $H_n$ is Heat of Vaporization of each water-soluble organic solvent (J/g);
      $B_n$=Boiling Point of each water-soluble organic solvent (° C.);
      $\Sigma$=sum of the multiplication products of $X_n$, $H_n$ and $B_n$ for each water-soluble organic solvent present in the composition; and
      $\rho$ is 2,000,000;
   c) applying the composition of step (b) to the substrate of step (a);
   d) removing at least a portion of the water and organic solvent from the composition applied on the substrate; and
   e) energy curing the composition on the substrate;
   wherein:
      i. the total amount of water-soluble organic solvents in the composition is 10 wt % to 40 wt %, based on the total weight of the composition; and wherein the composition comprises less than or equal to 2.5 wt % water-soluble organic solvents having boiling points of 150° C. or greater and heats of vaporization of equal to or greater than 400 J/g;
      ii. the substrate is selected from the group consisting of vinyl, acrylic, polystyrene, polycarbonate, polyester, polyethylene terephthalate, glycol modified polyethylene terephthalate, poly(olefin), nylon, polypropylene, polyethylene, cellulose acetates, poly(lactic acid), aluminum, aluminum oxide, silicon oxide, poly(vinylidene dichloride), and nitrocellulose; and
      iii. the article is a food packaging article.

21. A food packaging article prepared by the method of claim 20.

* * * * *